United States Patent [19]
Bullitt et al.

[11] Patent Number: 5,539,459
[45] Date of Patent: Jul. 23, 1996

[54] OPTIMAL TONE SCALE MAPPING IN ELECTRONIC CAMERAS

[75] Inventors: Julian G. Bullitt, Newton; Allan C. Green, Framingham, both of Mass.

[73] Assignee: Polaroid Corporation, Cambridge, Mass.

[21] Appl. No.: 443,680

[22] Filed: May 18, 1995

[51] Int. Cl.⁶ .......................... H04N 5/202; H04N 5/235
[52] U.S. Cl. ........................... 348/254; 348/675; 358/519
[58] Field of Search .................................. 348/674, 675, 348/254, 256, 259, 260; 358/519, 518; H04N 9/69, 5/202, 5/235

[56] References Cited

U.S. PATENT DOCUMENTS

| | | | |
|---|---|---|---|
| 4,394,744 | 7/1983 | Wrench, Jr. | 364/553 |
| 4,663,667 | 5/1987 | Shenk | 358/169 |
| 4,670,788 | 6/1987 | Ozaki | 358/164 |
| 4,825,293 | 4/1989 | Kobayashi et al. | 358/22 |
| 4,939,581 | 7/1990 | Shalit | 358/244 |
| 4,959,727 | 9/1990 | Imaide et al. | 358/228 |
| 5,047,861 | 9/1991 | Houchin et al. | 358/213.15 |
| 5,075,778 | 12/1991 | Saito | 358/228 |
| 5,079,622 | 1/1992 | Toshinobu | 358/32 |
| 5,162,902 | 11/1992 | Bell et al. | 358/168 |
| 5,243,426 | 9/1993 | Murayama et al. | 358/164 |
| 5,345,265 | 9/1994 | Kim | 348/254 |

FOREIGN PATENT DOCUMENTS

| | | | |
|---|---|---|---|
| 529635 | 3/1993 | European Pat. Off. | H04N 5/202 |
| 219370 | 8/1990 | Japan | H04N 5/202 |

OTHER PUBLICATIONS

Y. Matsuede, et al., "S14-2 3.7-in. HDTV Poly-Si TFT-LCD Light Valve with Fully Integrated Peripheral Drivers," Paper from *Japan Display '92*.

Y. Matsuede, et al., "HDTV poly-Si TFT-LCD light valve with 70% aperture radio," Paper from *The 13th International Display Research Conference*, Aug. 31-Sep. 3, 1993, pp. 601-604.

Nauta, Henk C., "An Integrated Gamma Corrector," *IEEE Journal of Solid-State Circuits*, vol. SC-16, No. 3, Jun. 1981, pp. 238-241.

Primary Examiner—Safet Metjahic
Assistant Examiner—Glenton B. Burgess
Attorney, Agent, or Firm—Christopher P. Ricci

[57] ABSTRACT

An improved electronic still imaging camera is described wherein electronic voltage values representative of an image are transformed according to an optimum tone scale mapping gamma curve. The gamma curve utilizes a subjective element along with an element associated with scene reflectivity to optimize tone scale variations according to steps in an analog-to-digital converter while reducing contouring in the image.

15 Claims, 5 Drawing Sheets

OPTIMAL TONE SCALE MAPPING IN ELECTRONIC CAMERAS

BACKGROUND OF THE INVENTION

The present invention relates generally to improved tone scale mapping in electronic cameras and, more particularly, the invention relates to an improved method and apparatus for increasing tone differentiation in a digitally recorded image without increasing a number of available discrete intervals.

The human visual system perceives high spatial frequencies of an image as sharpness and low spatial frequencies as tone scale. That is, sharpness of an image is generally a function of how well the edges of an object in an image are perceived whereas the tone scale is a function of how the image's color and its gradual variation over the extent of the image are perceived. Since the human visual system perceives sharpened images much more favorably than unsharpened images, most electronic imaging systems which process recorded images attempt to provide sharpened images for human viewing.

In electronic imaging cameras, charge coupled devices (hereinafter "CCD"'s) capture the image and transform the image into an analog signal. The analog signal is then transformed according to a gamma correction curve. The transformed image is passed through an analog-to-digital converter ("A/D") creating a digital signal representative of the image.

Historically, video camera recordings were displayed on cathode ray tubes ("CRT"'s), which have a characteristic gamma curve. Another gamma correction curve was employed in the video camera to create a system tone scale in the recording which is pleasing to the human eye as shown on the CRT. Conventional photography has also made use of gamma correction curves in the form of density-exposure curves, commonly known as D-log H curves in the art, by adjusting chemical balances in film and processing. This is analogous to the video use of gamma curves in that the film is now being used to alter the tone scale perception to create tone scales that are more pleasing to the human eye in a hard copy of the image.

These two examples of cameras are utilizing gamma curves to correct for an output device to make the image as displayed on the output device more pleasing to the eye. In an electronic still image camera the output device can vary from a film recorder wherein conventional photographic film is utilized, a laser printer where a color image is rendered upon paper, or the image may simply be transmitted to a computer where it is displayed upon a CRT, inter alia. A gamma curve for all of these scenarios must then be designed into the camera which compromises between these output devices.

An additional problem in electronic still image cameras is that the image is ultimately digitized through the A/D. The problem here arises in that tone scale changes may be lost if discrete intervals of the digitization are too large. Large steps in digitization create contouring seen in an image as uneven steps between tone which are noticeable to the human eye. In other words, where tones are changing rapidly, the divisions between the digitized words may not be close enough together to represent the large changes in tone scale smoothly without contours. Therefore, the eye is able to see the changes reducing how pleasing the image looks to the eye. This is called contouring. The size of the discrete interval can be decreased by increasing the number of bits of the digitization. As the number of bits increases though, so does the cost of the circuitry to perform the digitization.

Therefore, it is an object of the invention to present a gamma curve that takes into consideration various output devices.

It is another object of the invention to reduce the cost of manufacturing still image cameras by minimizing the number of bits in the A/D.

It is still another object of the invention to reduce contouring in an electronic still image thus avoiding visible steps between quantized levels of the image. These and other objects of the invention will be obvious and will appear hereinafter.

SUMMARY OF THE INVENTION

The aforementioned and other objects are achieved by the invention which provides an electronic still camera which performs an optimum gamma correction. The optimum gamma correction prevents an occurrence of contours in the presence of exposure errors that normally occur in the capture of an image. The electronic still camera comprises a means for defining an image plane, optical means, photosensitive means, video signal processing means, analog-to-digital conversion means, and processing means.

The optical means directs image bearing light from a scene to the image plane to form an optical image of the scene on the image plane.

The photosensitive means is located at the image plane for receiving the image bearing light and producing therefrom, according to a transfer function inherent in the photosensitive means, analog image signals representative of said image. Voltage values of the analog image signals are indicative of image intensity;

The video signal processing means then transforms the analog image signals according to a gamma curve so as to compensate for the transfer function of the photosensitive means. The gamma curve also adjusts a tone scale of the image such that sharp changes in tone are elongated and relatively flat changes in tone are compressed thus creating a transformed signal.

The analog-to-digital conversion means converts the transformed signal to a stream of said electronic image signals representative of the image and the processing means then selectively processes, stores or transmits the electronic image data.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

Figure 1:
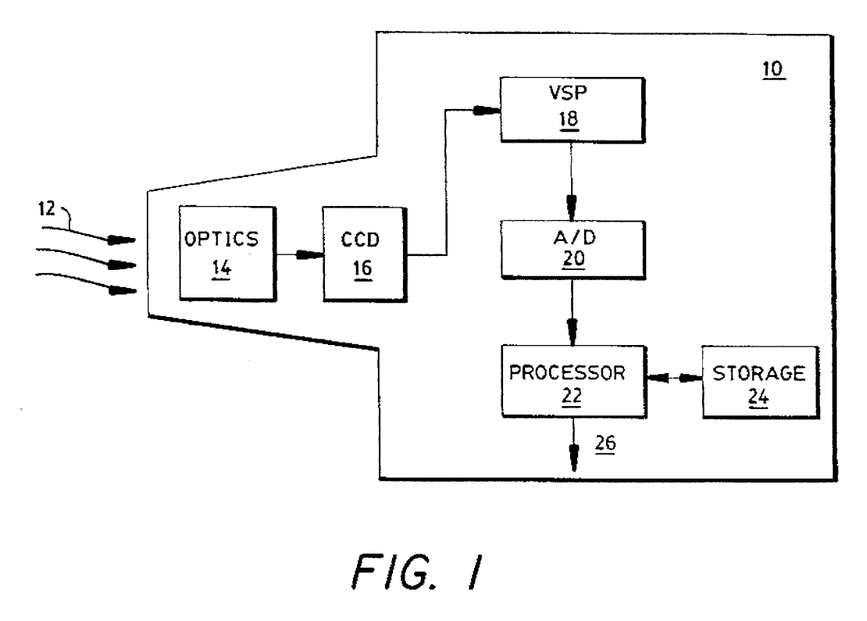
FIG. 1 shows a block diagram of an electronic still camera in accordance with the invention.

Electronic imaging cameras for recording either motion or still images are in common usage today. Such cameras generally include, as is shown in FIG. 1, a two-dimensional photosensitive array which may comprise a high-resolution charge coupled device ("CCD"), charge injection device ("CID"), or other photosensitive sensors. A CCD 16 is depicted in the preferred embodiment but this type of photosensitive array should be considered illustrative and not restrictive. The CCD 16 receives light 12 representative of the image scene in a well-known manner by way of an objective lens and a shutter as shown collectively as optics 14.

The CCD 16 typically comprises a plurality of image sensing elements or pixels arranged in a two-dimensional array with each image sensing pixel converting image defining light reflected from a scene into a corresponding analog voltage value. Sampling is done sequentially for the three primary colors red, green, and blue (hereinafter referred to as "RGB"), and the image sensing elements are preferably arranged in a plurality of rows and columns. For example, in an imaging application the resolution of the electro-optically sampled image comprises approximately 1656 image points, or pixels, per line horizontally and 600 lines vertically. Accordingly, each image has an aggregate 1656×600 pixels wherein each pixel is assigned one of the RGB colors.

When an image is captured by an electronic imaging camera, a steady stream of analog voltage values associated with the pixel values for a given row of the image sensing elements are presented to a video signal processor ("VSP") 18 which compresses the analog voltage values that are associated with the highlights of the recorded image while emphasizing, or elongating, the analog voltage values that are associated with the midtones of the recorded image. In essence the video signal processor compresses the tone of the analog voltages by using a tone compression curve having a specified gamma function.

An analog-to-digital converter 20 then transforms row by row the analog voltage values into a plurality of digital electronic image data signals representing the recorded image in a RGB color coordinate system.

The digitized signal is then passed into a processor 22 where it can be stored in a storage device 24 such as an electromagnetic storage device, a hard disk for example, an electro-optical storage device 24, or it may simply be passed onto a computer which is connected to the camera via a cable. In the illustrated embodiment, the signal 26 will be passed externally to the computer.

When the camera 10 is focused upon a subject and a shutter of the optics 14 is opened, varying levels of illumination become incident upon a face of the CCD 16. In shadow areas the level of illumination will be quite low. For highlights, the level will be great. In fact, for every different subject tone there will be a different level of illumination incident upon the CCD 16. These light levels are referred to as illuminants since they deal with light incident upon a film plane, or CCD 16. The camera's shutter speed determines a length of time the illumination representative of an image light will be incident upon the CCD 16.

In conventional photography a negative is exposed to varying amounts of illuminant, H. Upon developing, a resulting image has varying densities according to the exposure. The exposure is the illuminant level multiplied by the exposure time, E=H×t. Since exposure time, t, is the same for the entire negative, the density of the negative is a function only of the illuminant H. Plotting this function is a D-log H curve. Note also that D=-log T, where T is emulsion transmission. A log—log plot is normally used in photography as a convenient way to express information over a wide range of illumination and transmittances of the negative. Scene reflectance (and hence illuminant levels, H, onto the negative) varies over ranges of 1000:1 from highlights to shadows. Expressed in log base 10 this is compressed to a range of 3:1.

Illuminants on the CCD 16 generate charge Q, linearly. Charge is linearly converted to voltage, V, by the capacitance of an output amplifier:

$$Q \propto H$$

$$V = \frac{Q}{C}$$

Figure 2A:
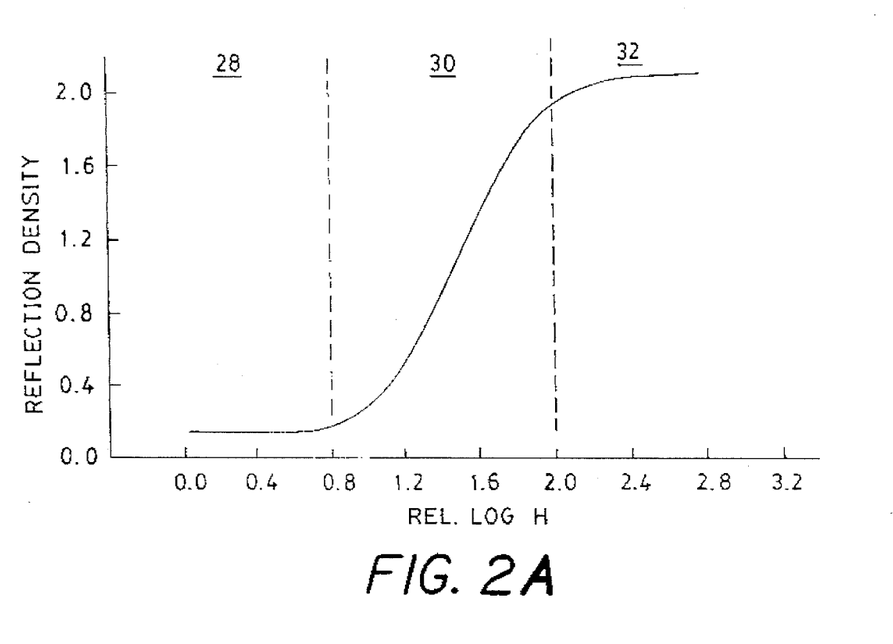
FIG. 2A shows a D-log H curve for the camera shown in FIG. 1.

A D-log H curve as described is shown in FIG. 2A. It can be seen from the figure that the first region 28 has a slope that is very flat and as exposure increases reflection density does not rise noticeably.

At a certain point in the curve the slope increases dramatically. This is shown as the second region 30 where as exposure increases, density increases greatly. In the third region 32, the density again flattens.

In conventional photography, making adjustments to these curves in the photographic material by way of chemistry can adjust how the camera portrays sharpness and contrast in a reflected image.

Figure 2B:
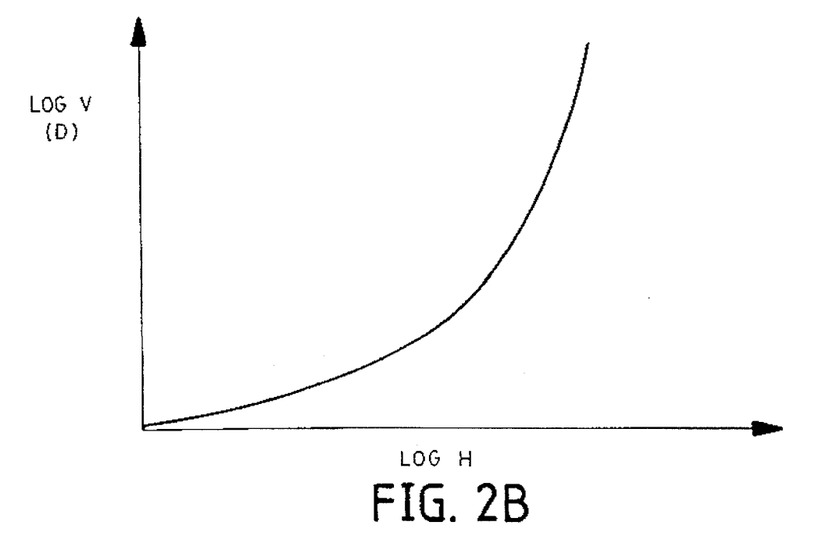
FIG. 2B shows a Log V-Log H curve for the camera shown in FIG. 1.

In the case of an electronic still camera 10 as previously shown, an image coming in that has the log V- log H curve as shown in FIG. 2B would be digitized using as many bytes for the flat regions 28, 32 as would be for the second region 30 having a steeper slope. With equal steps between the bytes, large changes in tone between digital steps are introduced as contouring or tone changes in the image which reduce a pleasing effect to the human eye. To avoid contouring, a gamma curve is introduced between CCD 16 and the A-D converter 20 by the video signal processor 18.

The video signal processor 18 transforms an analog signal coming out of the CCD 16 representative of the image such that uniform steps in the A-D are concentrated in the second region 30 of the D-Log H curve. This transform is known as the gamma curve. A designer must define the system tone scale, G, before the gamma can be implemented. G is a tonescale mapping function of a "system." An analog to G in standard photography is the D-log H curve where a psychophysical characteristic of the system is defined by the equation $$R_{print} = G \, R_{scene}$$

Having chosen the system tonescale map, G, the designer now distributes the limited number of bits in the A/D along the tonescale so that no contouring will be visible in the display or print. A criteria for an absence of visible contours is that a difference in lightness between adjacent levels should be less than the visual threshold. CIELab is a psychovisual model of uniform color space. L* is a measure of lightness in the CIELab space. Equal increments of L* are perceived as uniform changes in lightness over a wide range of display illuminants and print reflectances. L* can be expressed as a function of display or print reflectance:

$$L^* = 116 \left( \frac{R_{print}}{R_{white}} \right)^{1/3} - 16$$

where
$R_{print}$ = print reflectance
$R_{white}$ = white reflectance

For convenience, $R_{white}$ is assumed to be equal to one since the print is printed on white paper. Because CIELab is visually uniform space, equal increments in L* are perceived as equally different. As a result, a well-known criterion for the absence of visual contours is that the changes in L* between levels, $\Delta L^*$, should be less than a given value.

Next, a proper step level for L* must be chosen. An example is quantizing the image in steps of equal print L*. With a properly exposed print the quantization steps are then less than 0.4 L* apart. This step level is sensitive to an error in exposure such that the quantized steps can become visible. A one stop exposure error will produce differences between levels in excess of 1.5 L*.

This step level can be modified to be robust in the presence of the exposure errors that occur. Instead of quantizing in equal steps of print L*, the signal is quantized in equal steps for a wider range of world reflectances than can be printed. This does not produce as uniform steps as with the previous scheme; however, the presence of an exposure error does not produce the large steps seen with the previous scheme.

To find $\Delta L^*$, on the print a differentiation is performed:

$$\Delta L^* = \frac{1}{3} (116) (R_{print})^{-2/3} \Delta R_{print}$$

This equation states that equal changes in L* are represented by equal changes in the psychophysical perception to the human eye.

To make changes of print reflectance imperceptible, set $\Delta L^* \leq 0.4$ which is below a threshold of visibility.

$$\Delta L^* = \frac{1}{3} (116) (R_{print})^{-2/3} \Delta R_{print} \leq 0.4$$

Rearranging:

$$\Delta R_{print} \leq \frac{1}{97} (R_{print})^{2/3}$$

This equation prescribes the maximum reflectance change of the print, $\Delta R_{print}$ that is allowed without perceivable contouring.

Figure 2C:
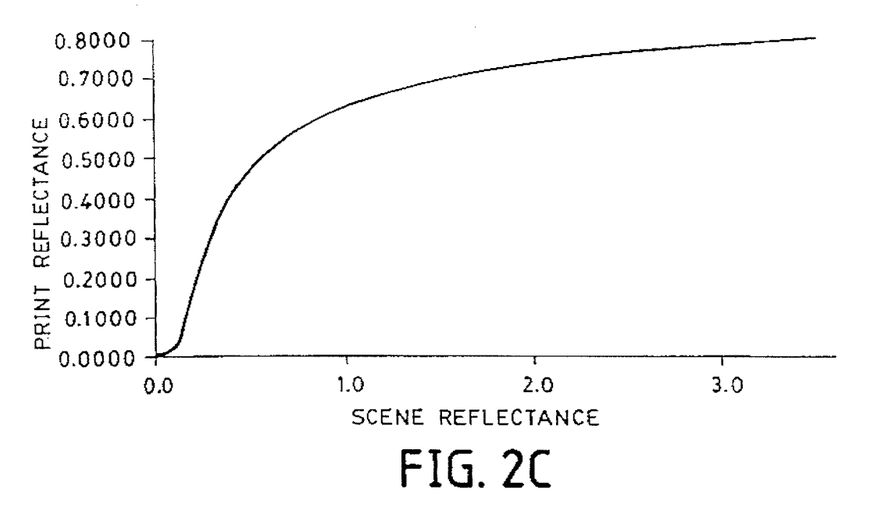
FIG. 2C shows a graph of scene reflectivity versus print reflectivity for the camera of FIG. 1.

Given the maximum allowable $\Delta R_{print}$ without contouring and the system tonescale map, G, the maximum allowable $\Delta R_{scene}$ is illustrated in FIG. 2C where clearly the $\Delta R_{scene}$'s become smaller in high slope regions of G. Using a derivative of a previous equation, an optimal tonescale map can now be derived:

$$\Delta R_{scene} = \Delta G^{-1} \Delta R_{print}$$

$$\gamma = \int \Delta R_{scene} = \int \Delta G^{-1} \Delta R_{print} dR$$

where $\gamma$ is the optimal tonescale map. Therefore, for no visible artifacts or contouring to occur, $\Delta R_{print}$ between quantization steps must be less than $\Delta G^{-1} \times \Delta R_{scene}$.

In practice though $\Delta R_{print} = 0$ at $R_{scene} = 0$, and, therefore, any change would produce an artifact in a linear system. But at $R_{scene} = 0$, $R_{print}$ (R)=0 therefore there is no gain. In general, to use a linear analog-to-digital converter ("A/D") $\gamma$ should map scene visibility such that each bit will reproduce an equally perceived lightness change when observing the print:

$$\Delta R_{print} \leq 0.0072 R_{print}^{2/3}$$

Implementing the above scheme in an electronic still camera ensures that an image captured by the camera is quantized such that the contours are at least visible in a print printed with a pleasing tone reproduction curve.

Figure 3A:
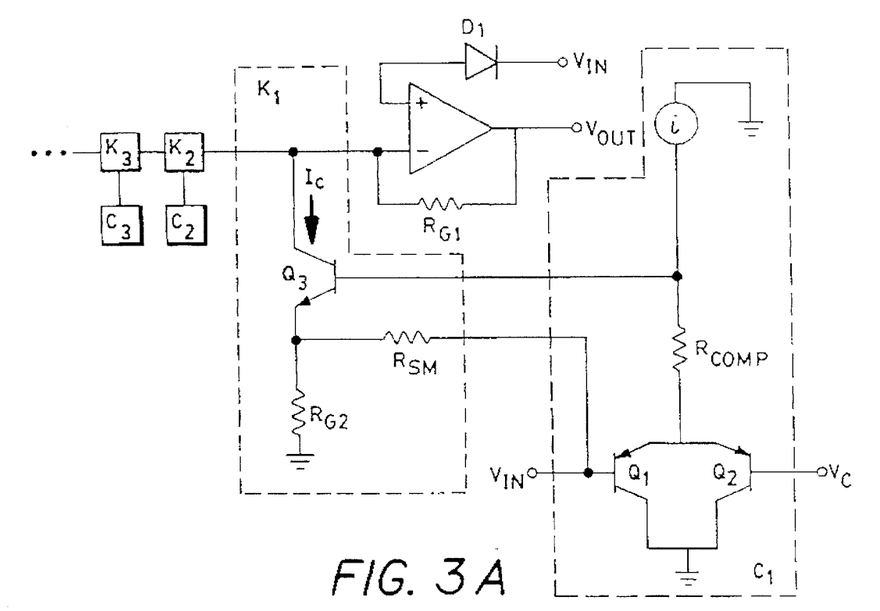
FIG. 3A shows a clipping circuit for use in the video signal processor in the camera according to FIG. 1.

Such a gamma curve is implemented in the video signal processor 18. The video signal processor 18 contains circuitry to transform the analog signal representing the image from the CCD 16, referred to as the input voltage $V_{IN}$, into a signal as previously described. A subpart of the overall circuit is shown in FIG. 3A.

Figure 3B:
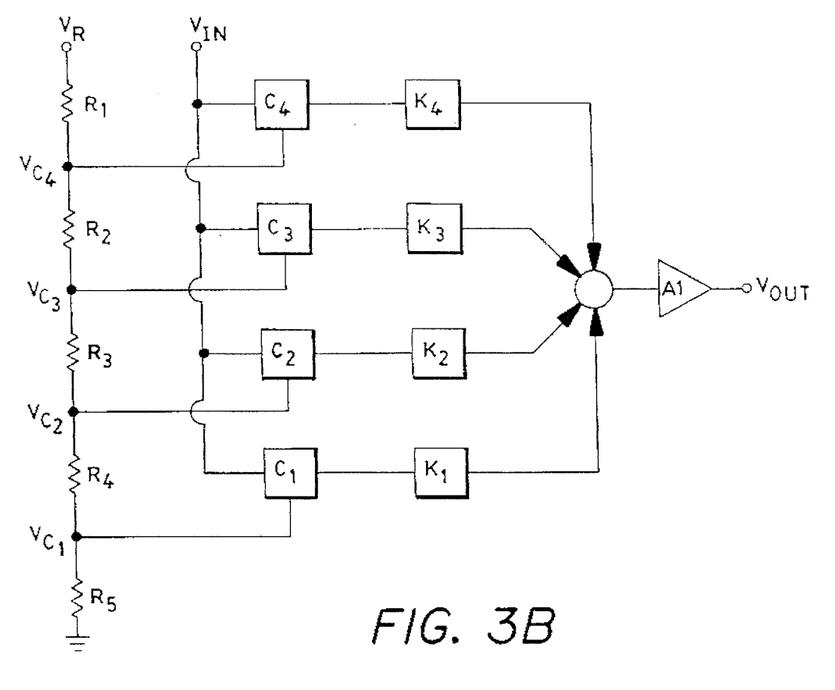
FIG. 3B illustrates a circuit implementing the gamma curve in a video signal processor for an electronic still camera in accordance with FIG. 1.

The subpart depicts a clipping circuit which is an integral part of the overall circuit shown in FIG. 3B. The clipping circuit utilizes a comparator and a buffer. A current source, i, drives the comparator through a compensating resistor, $R_{COMP}$, described in greater detail hereinafter.

The comparator utilizes two branched PNP transistors Q1 and Q2 where Q2 is fed by a clipping voltage, $V_C$, and Q1 is fed by an input voltage, $V_{IN}$. The clipping voltage determines the level to which the input voltage, $V_{IN}$, is compared. The input voltage is representative of an image captured by the CCD. If the voltage $V_{IN}$ is less than the clipping voltage, $V_C$, then current through Q3 will be determined by $V_{IN}/R_{G2}$. Once $V_{IN}$ becomes equal to or greater than the clipping voltage, $V_C$, Q1 goes into a cutoff mode and thus no longer effects changes to the current through Q3.

Transistor Q3 is an NPN transistor whose collector feeds off of an operational amplifier ("op amp"), $A_1$. The compensating resistor, $R_{COMP}$, is then used to match the $V_{BE}$ characteristics of the NPN transistor Q3 to characteristics of the PNP transistors Q1 and Q2.

Q3 serves as a buffer, placing $V_{IN}$ across the resistor $R_{G2}$. This ensures a current which is representative of the input voltage, $V_{IN}$. This stage, shown as $K_1$ in FIG. 3A, is used to provide voltage-to-current conversion, as well as provide a current gain which is fixed by a ratio of $R_{G1}$ to $R_{G2}$ when $V_{IN} < V_C$.

Voltage-to-current conversion is accomplished by converting a voltage at the base of Q3 into $i_c \approx V_{IN}/R_{G2}$. Once $V_{IN} > V_C$, $I_c$ decreases as $V_{IN}$ increases, i.e. $\Delta V_{IN}/R_{sm}$. Thus, a change in gain for $V_{IN} > V_C$ is a function of $R_{sm}$ for block K1.

The op amp has as a non-inverting input the input voltage, $V_{IN}$, increased by 0.7 V through a diode, $D_1$. The voltage increase is introduced to level shift $V_{IN}$ equally with that of the inverting input. In other words, the diode compensates for the voltage increase across the P-N junction of the base-emitter of Q3. Varying the base current to Q3 then varies current drawn from the op amp, $A_1$, causing the output voltage, $V_{OUT}$, to vary proportionally.

A smoothing resistor, $R_{sm}$, is also shown which is tied to the input voltage, $V_{IN}$. The path established between $V_{IN}$ and the emitter of Q3 ensures that after the cutoff voltage, $V_C$, is reached by $V_{IN}$ and the current drawn from the op amp due to $K_1$ shifts to a constant value, there is still a current contribution through $R_{sm}$ producing a smooth transition to the constant value. Graphically, the smoothing rounds the sharp corner produced when the current is suddenly clipped.

However, as the input $V_{IN}$ increases, a series of other gain blocks, $K_2$, $K_3$, et cetera, draw additional current from the op amp depending on the value of $V_{IN}$ and how the clipping voltages, $V_c$, are defined and, thus, continue to alter the output voltage, $V_{OUT}$. When $V_{IN}$ is small, all gain blocks draw current from the op amp to produce maximum gain at small values of $V_{IN}$. As $V_{IN}$ increases, each gain block stops contributing to an increasing output. The gamma shape is thus defined by ever-decreasing gain as a function of the input. In this way the op amp acts like a summing block by adding contributions of the individual gain blocks to produce the gamma curve. The current contributions from each gain block are determined by the clipping voltages and the gains of the gain blocks, thus determining a shape of the gamma curve. The smoothing resistor, $R_{sm}$, then acts to provide smoother, sharper transitions on the Gamma curve.

One skilled in the art will realize that the circuit as shown in FIG. 3A ignores DC offsets of the input voltage, $V_{IN}$, which must eventually be handled in manners well known in the art.

The clipping circuit of FIG. 3A is utilized extensively in the video signal processor as shown in FIG. 3B. The video signal processor has a tree structure where various taps are utilized along the tree. In describing the figure, exemplary voltage values are used, but these values must be altered for each application to shape the Gamma curve. The tree has a reference voltage, $V_R$, of one volt. A first resistor $R_1$ having a resistance to effectuate a voltage drop of 0.2 V supplies the first clipping circuit with a voltage of $V_{C1}=0.8$ V. It should be noted that various increment sizes can be used and a different maximum voltage value can be used without detriment to the invention. A voltage of 0.8 V for the first clipping circuit $C_1$ represents the clipping voltage $V_C$ as previously described. A voltage input being the voltage from the CCD 16 representative of an image is fed into the clipping circuit as $V_{IN}$ and is compared against the clipping voltage $V_C=0.8$ V. The output is a current which runs through the N-P-N transistor $Q_3$ of gain block $K_1$. This output is then summed and current-to-voltage conversion is performed to provide a contribution to the final output $V_{OUT}$.

Figure 3C:
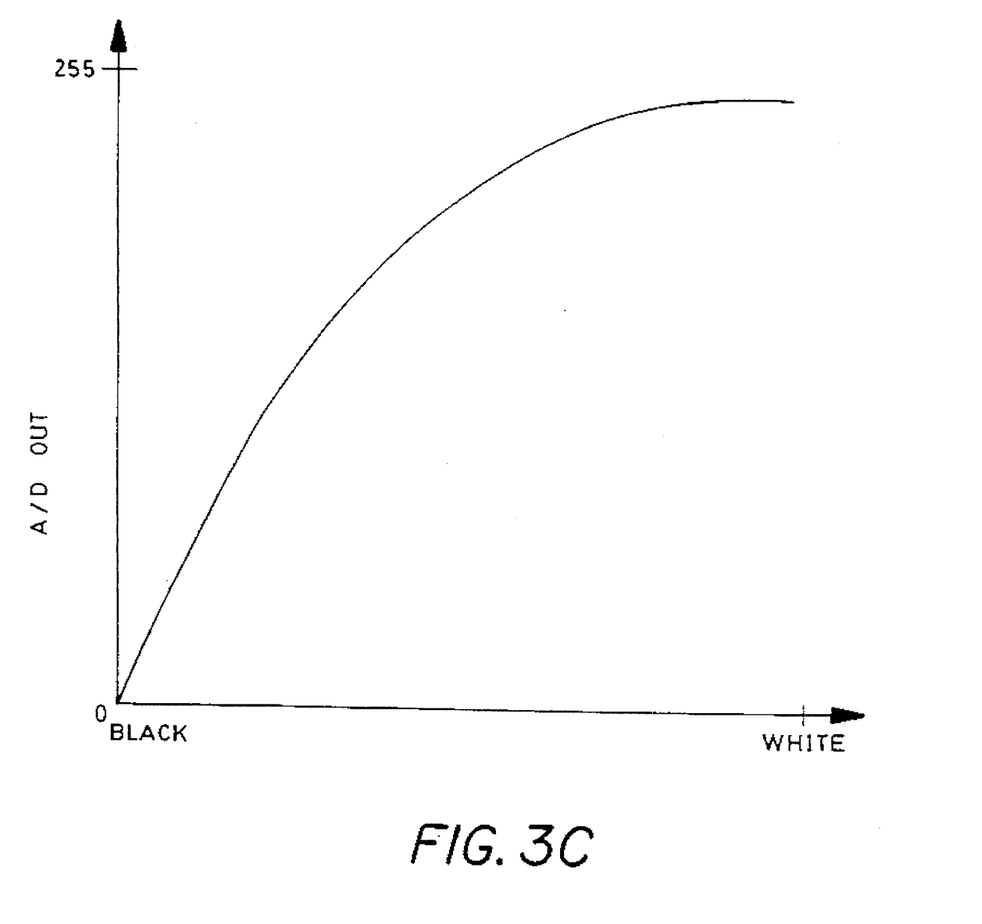
FIG. 3C shows a voltage output curve out of the video signal processor for the electronic still camera of FIG. 1.

A second clipping circuit is fed off of the tree below $R_2$ which like before has a 0.2 V voltage drop thus providing a clipping voltage $V_{C2}=0.6$ volts for the second clipping circuit $C_2$. $V_{IN}$ is then compared against $V_c$ in $C_2$ and is again summed to add its contributions to $V_{OUT}$. Likewise the 3rd and 4th clipping circuit compare against $V_{C3}=0.4$ V and $V_{C4}=0.2$ V respectively. These currents are all added together with the cumulative signal passing through a current-to-voltage converter to produce $V_{out}$. FIG. 3C depicts a typical $V_{out}$ output which is then passed through an A/D, in this case sampled between 0 and 255, creating a more uniform transition between black and white where contouring has essentially been alleviated by spreading out the steps between 0 and 255 along a more gradual curve.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An electronic still camera comprising
  means for defining an image plane;
  optical means for directing image bearing light from a scene to said image plane to form an optical image of the scene on the image plane;
  photosensitive means located at said image plane for receiving said image bearing light and producing therefrom analog image signals representative of pixels of said image wherein voltage magnitudes of the analog image signals are indicative of pixel intensity;
  video signal processing means for transforming the analog image signals according to a gamma curve so as to adjust a tone scale of the image such that sharp changes in tone are elongated and relatively flat changes in tone are compressed thus creating a transformed signal;
  analog-to-digital conversion means for converting said transformed signal to a stream of digital image signals representative of the image; and
  processing means for selectively processing, storing or transmitting image data represented by the digital image signals.

2. The electronic still camera according to claim 1 wherein said video signal processing means transforms the analog image signals such that contouring does not occur.

3. The electronic still camera according to claim 1 wherein said video signal processing means transforms the analog image signals according to the following formula $$\gamma = \int \Delta G^{-1} \Delta R \, dt$$

where G is a tonescale mapping function of the electronic still camera and R is a reflectivity of said scene.

4. The electronic still camera according to claim 3 wherein said video signal processing means transforms the analog image signals such that $\Delta G$ includes compensation for an intended output device.

5. The electronic still camera according to claim 3 wherein the analog-to-digital conversion means is a linear analog-to-digital converter and, thus, to reproduce an equally perceived lightness change when observing the image, the video signal processing means constrains $\Delta R$ according to the following formula $$\Delta R \leq 0.0072 \, R^{2/3}$$

6. The electronic still camera according to claim 1 wherein the photosensitive means has an inherent transfer function and the video signal processor compensates for the inherent transfer function of the photosensitive means to better define the analog image signals.

7. An electronic still camera for capturing light reflected from a scene and translating the light into electronic image data of high photographic quality, said electronic still camera comprising
  optical means for focusing the light into the electronic still camera for a predetermined amount of time;
  photosensitive means in optical alignment with said optical means for receiving the light and translating the light into a matrix of pixels represented by analog voltage values;
  video signal processing means for transforming the analog voltage values according to a predetermined curve such that sharp changes in tone are elongated and relatively flat changes in tone are compressed to create a transformed signal more amenable to digital conversion;

analog-to-digital conversion means for converting said transformed signal to a stream of said electronic image data representative of the scene; and processing means for selectively processing, storing or transmitting said electronic image data.

8. The electronic still camera according to claim 7 wherein said video signal processing means transforms the analog voltage value such that contouring does not occur.

9. The electronic still camera according to claim 7 wherein said video signal processing means transforms the analog voltage values according to the following formula $$\gamma_R = \int \Delta G \Delta R dt$$

where G is a tonescale mapping function of the electronic still camera and R is a reflectivity of said scene.

10. The electronic still camera according to claim 9 wherein said video signal processing means transforms the analog voltage value such that $\Delta G$ includes compensation for an intended output device.

11. The electronic still camera according to claim 9 wherein the analog-to-digital conversion means is a linear analog-to-digital converter and, thus, to reproduce an equally perceived lightness change when observing the image, the video signal processing means constrains $\Delta R$ according to the following formula $$\Delta R \leq 0.0072 \, R^{2/3}$$

12. The electronic still camera according to claim 7 wherein the photosensitive means has an inherent transfer function and the video signal processor compensates for the inherent transfer function of the photosensitive means to better define the analog image signals.

13. A method for capturing light reflected from a scene and translating the light into electronic image data of high photographic quality, said method comprising focusing the light into the electronic still camera for a predetermined amount of time;

receiving the light and translating the light into a matrix of pixels represented by analog voltage values;

transforming the analog voltage values according to a predetermined curve such that sharp changes in tone are elongated and relatively flat changes in tone are compressed to create a transformed signal more amenable to digital conversion;

converting said transformed signal to a stream of said electronic image data representative of the scene; and selectively processing, storing or transmitting said electronic image data.

14. The method according to claim 13 further comprising a step of transforming the analog voltage values according to the following formula $$\gamma_R = \int \Delta G \Delta R dt$$

where G is a tonescale mapping function of the electronic still camera and R is a reflectivity of said scene.

15. The method according to claim 14 further comprising a step of reproducing the image on a hard-copy medium where the reproduced image has an equally perceived lightness change, $\Delta R$, when observing the image by constraining $\Delta R$ according to the following formula $$\Delta R \leq 0.0072 \, R^{2/3}$$

* * * * *